United States Patent
Jiang et al.

(10) Patent No.: US 6,651,730 B2
(45) Date of Patent: Nov. 25, 2003

(54) SLURRY COMPOSITION AND PROCESS FOR PRODUCING CERAMIC MOULDS

(75) Inventors: Jiaren Jiang, London (CA); Xing Yang Liu, London (CA)

(73) Assignee: National Research Council of Canada (CA)

(*) Notice: Subject to any disclaimer, the term of this patent is extended or adjusted under 35 U.S.C. 154(b) by 28 days.

(21) Appl. No.: 10/078,752

(22) Filed: Feb. 19, 2002

(65) Prior Publication Data

US 2003/0159798 A1 Aug. 28, 2003

(51) Int. Cl.[7] .................................................. B22C 9/00
(52) U.S. Cl. ........................ 164/529; 164/516; 164/517; 164/523
(58) Field of Search .............................. 164/529, 516, 164/517, 523

(56) References Cited

U.S. PATENT DOCUMENTS

| | | | |
|---|---|---|---|
| 2,795,022 A | 6/1957 | Shaw et al. ................. 164/12 |
| 2,811,760 A | 11/1957 | Shaw et al. ................. 164/12 |
| 2,931,081 A | 4/1960 | Dunlop ...................... 164/12 |
| 3,022,555 A | 2/1962 | Shaw ......................... 164/12 |
| 3,172,176 A | 3/1965 | Greenwood ................. 164/12 |
| 3,690,366 A | 9/1972 | Schwartz .................... 164/25 |
| 4,948,765 A | * 8/1990 | Snook ........................ 501/127 |
| 5,368,086 A | 11/1994 | Kloskowski ................. 164/33 |
| 6,450,243 B1 | * 9/2002 | Shaw et al. ................. 164/519 |

* cited by examiner

*Primary Examiner*—Tom Dunn
*Assistant Examiner*—I.-H. Lin
(74) *Attorney, Agent, or Firm*—Pendorf & Cutliff

(57) ABSTRACT

A ceramic mould slurry is disclosed for forming moulds and metal castings of improved surface quality. The slurry comprises a binder, a gelling agent, a first refractory material having a density of $\rho 1$ and a mean particle size of $\alpha 1$, and a second refractory material having a density of $\rho 2$ and a mean particle size of $\alpha 2$, wherein $\rho 1 > \rho 2$ and $\alpha 1 < \alpha 2$. The denser refractory material migrates downward through the slurry toward the upward-facing mould surface, thereby allowing formation of a smooth and accurate surface.

4 Claims, 3 Drawing Sheets

US 6,651,730 B2

SLURRY COMPOSITION AND PROCESS FOR PRODUCING CERAMIC MOULDS

FIELD OF THE INVENTION

The invention relates to ceramic moulds for metal casting. More particularly, the invention relates to a ceramic mould for precision metal casting, a slurry used to fabricate a ceramic mould, and a process for producing a ceramic mould.

BACKGROUND OF THE INVENTION

Ceramic moulding or ceramic mould casting is a foundry process aimed at economically providing a high degree of precision and outstanding metal soundness in the production of cast parts with no presently known size restriction. Conventional ceramic mould casting processes yield the type of tolerances equivalent to lost wax precision casting and at a significantly lower cost, comparable to sand casting processes, for casting a small number of parts. However, ceramic moulding processes still require improvements, and there is a constant demand for increased accuracy, improved surface finish, increased consistency of castings produced, and for simplification of the process. Examples of conventional ceramic mould casting processes can be found in U.S. Pat. Nos. 2,795,022; 2,811,760; 2,931,081; 3,022,555; and 3,172,176.

Currently, the most commonly used ceramic mould casting process is the Shaw process or its variants, such as the Unicast process. In these processes, a ceramic mould is first fabricated by admixing a binder, a gelling agent and comminuted refractory material (reduced to minute particles by crushing, grinding, or pulverising) to form a slurry. The slurry is then cast around a pattern and is allowed to set, after which time the pattern is stripped from the set ceramic mould and the mould is stabilised.

The binder used in the slurry typically comprises a lower alkyl silicate, such as ethyl silicate, which yields an alcohol on hydrolysis and which is sufficiently volatile to burn when ignited. The refractory material is selected so that it can withstand the high heat and does not react with the molten metal during casting. The refractory material is normally composed of two or more grades of ingredients having different particle size: the finer grade of ingredients imparts a smooth surface finish to the casting and the coarser grade of ingredients, in appropriate proportions, reduces the shrinkage and distortions in the mould.

The stabilisation treatment "fixes" the dimensions of the ceramic mould after which it will not change during the subsequent baking and casting process. In the Shaw process, after setting and stripping the pattern, the mould is immediately subjected to a rapid, uniform and intense flame firing, whereby all of the volatiles escape from the set mould. The rapid burning and intense heat cause micro-cracks to develop (known as "crazing"), which renders a dimensional freezing, so that the mould is immune to subsequent severe thermal shocks.

In the Unicast process, after stripping the pattern from the set mould, the mould is not immediately ignited by a flame but is either immersed in or sprayed with a hardening liquid to chemically stop excessive gelling reaction of the binder, and thus the mould dimensions are stabilised. The hardening liquid is miscible with alcohol. The mould can then be ignited to burn off most of the volatiles before it is fired at elevated temperatures. The Unicast process does not require immediate burning of alcohol from the ceramic mould and hence simplifies the operation of the mould-making process.

An inherent problem in the conventional ceramic mould fabrication processes is that the mould is usually subject to distortions, such as twisting, warpage and cracking.

These distortions deteriorate the accuracy of the mould and increase surface irregularities. Sometimes cracking results in complete destruction of the mould. This problem originates from shrinking of the mould while the binder is gelling.

U.S. Pat. No. 3,690,366 discloses a process that reduces the excessive shrinkage of the mould by decreasing the amount of binder necessary to render the slurry flowable. However, decreasing the amount of binder in the slurry requires an increase in the amount of coarse particles in the refractory mixture, making it difficult to achieve a smooth surface finish on the resulting metal casting. To obtain a smooth surface finish, high proportions of fine particle ingredients are required, calling for the use of more binder. Thus, a compromise between obtaining a reasonable surface finish and reducing mould distortion and cracking must be reached. In practice, it is not a trivial task to determine the optimal refractory composition for a particular application. In addition, because the actual size, distribution and shape of particles vary with different producers and with different batches, it becomes very difficult to maintain a consistent surface finish and dimensional accuracy among the castings produced.

Other conventional ceramic mould casting processes include the fabrication of composite ceramic moulds to reduce mould distortions (such as warpage and twisting) and mould cracking, and to reduce costs by using inexpensive materials for the backing layer. In one of the processes for making composite ceramic moulds, crushed ceramic mould fragments made in accordance with the Shaw process are incorporated into the ceramic slurry for making the new ceramic mould. The main purpose of this process is to reduce the considerable distortions, such as warpage and twisting, associated with the original Shaw process.

However, the use of composite ceramic moulds has still not proven satisfactory either for the production of metal castings requiring very tight tolerances or for applications where those tight tolerances need to be consistent among different moulds made from the same pattern. In practice, the slurry does not adhere well to the crushings or slabs or to the backing layer as it gels. Such a mould is weak and unstable and the heat of the molten metal causes the mould to break apart.

Another process for making ceramic composite moulds produces a mould having a two-layer structure: a facing layer and a backing layer. An example of such a process can be found in U.S. Pat. No. 5,368,086. The facing layer is made of materials with suitable refractoriness for the casting process, usually higher than that of the backing layer, and contains more fine refractory ingredients to produce smooth surface finishes for the castings. There are two different practical variations of this process. One variation makes the facing layer first and then, after setting of the facing layer, makes the backing layer. The other variation reverses the order, making the backing layer first over an oversized pattern and then, after setting of the backing layer, making the facing layer by pouring a slurry in the gap formed between the backing layer and a pattern having the final dimensions. After the two layers have set, the composite body of the mould is ignited to remove volatiles and is further fired at elevated temperatures before casting.

In addition to the advantage of reducing cost, an apparent benefit of these two-layered moulds is that the properties of the backing layer and the facing layer can be adjusted independently to achieve optimum results. For example, the backing layer may be made from coarser particles to allow the volatiles to escape readily. At the same time, a highly refractory and very fine facing layer could be formed to resist the heat of the molten metal and to provide a smooth casting surface.

A disadvantage of two-layered moulds is that the gelled slurry expands when it is subsequently fired or baked, but the backing layer does not expand by the same amount. As a result, separations can occur between the surfaces of the hardened slurry and the surfaces of the backing layer. In the cases where "inexpensive" backing materials are used, the refractoriness of the backing layer is usually much lower than that of the facing layer, leading to more distortions and dimensional inaccuracies in the casting produced using such moulds. Thus, achieving the same tolerance among two moulds made from the same pattern is extremely difficult and, as a practical matter, can only be attained randomly.

Other problems are also inherent in two-layer mould fabrication processes. For example, there is no reliable way to judge the optimal gelling time of the facing layer. The optimal gelling time depends on a variety of factors, such as average particle size, volume of refractory material, gelling agent/accelerator, water, and mixing time, all of which tend to differ with each slurry prepared. If the facing layer is not permitted to gel for a long enough period of time, it will run or deform under the influence of its own gravitational forces after the two-layered mould is removed from the pattern, causing changes in the shape of the mould and thus affecting accuracy. On the other hand, if the facing layer is permitted to gel for too long a period of time, it will not adhere well to the backing layer. These problems are encountered even when the facing layer is formed first. A further disadvantage is that the two-layered mould process is more complex, involves more steps, and is more time consuming than a single layer process.

As mentioned above, the dimensional stability of a ceramic mould during the casting process relies on the stabilisation treatment. However, a considerable amount of the distortion (e.g. warpage and twisting) and cracking occurs before and during the stabilisation treatment process. An important factor affecting the distortion and cracking of the ceramic mould is the amount of liquid binder used in the slurry, which depends on the composition of the slurry. Generally, the more binder in the slurry, the more distortion and cracking occur in the mould.

A method of reducing dimensional changes and distortions before and during the stabilisation treatment process is disclosed in the U.S. Pat. No. 3,690,366 which suggests that the ratio of binder, in ml, to 100 g refractory should be kept below $33.6/\rho$, where $\rho$ is the density of the packed refractory powder. This document states that a slurry meeting this requirement will avoid mould cracking during stabilisation treatment by drying in the atmosphere.

There is a need for a process for ceramic mould casting that allows for a reduced amount of binder in the slurry without detrimentally increasing surface roughness. Further, there is a need for a simplified process that allows for formation of a high quality mould surface having high mould accuracy.

SUMMARY OF THE INVENTION

It is an object of the present invention to provide a ceramic mould, a slurry composition, and a process for forming a mould, which obviate or mitigate at least one disadvantage of the prior art.

In a first aspect, the present invention provides a ceramic mould slurry comprising a binder, a gelling agent, a first refractory material having a density of $\rho 1$ and a mean particle size of $\alpha 2$, and a second refractory material having a density of $\rho 2$ and a mean particle size of $\alpha 2$, wherein $\rho 1 > 2$ and $\alpha 1 < \alpha 2$. Thus, the denser particles have a smaller mean particle size.

The first refractory material has a smaller mean particle size ($\alpha 1$) than that of the second refractory material ($\alpha 2$). This allows for the formation of a better mould and casting surface finish. The first refractory material can be of any acceptable size as determined by a person skilled in the art. For example, mean particle size of the first refractory material ($\alpha 1$) may be from about −100 to about −400 mesh, and mean particle size of the second refractory material ($\alpha 2$) may be coarser than about 100 mesh, for example, from about 20 to about 100 mesh.

The invention additionally provides a process for producing a ceramic mould comprising the steps of: (a) preparing a slurry comprising a binder, a gelling agent, a first refractory material having a density of $\rho 1$ and a mean particle size of $\alpha 1$, and a second refractory material having a density of $\rho 2$ and a mean particle size of $\alpha 2$, wherein $\rho 1 > 2$ and $\alpha 1 < \alpha 2$; and (b) casting a ceramic mould using the slurry.

According to one embodiment of the invention, there is provided a slurry for preparing a ceramic mould for use in the ceramic mould casting process. The slurry contains at least two refractory materials with different densities. The materials differ in particle size, so that the denser material has a smaller mean particle size. Advantageously, the invention allows independent selection of fractions of fine and coarse refractory materials. Moulds produced according to the invention, and castings produced with such moulds have both a consistently high accuracy and a good surface finish. A further advantage of the instant invention over prior art two-layer processes is that the mould fabrication process is simplified. Further, the inventive process minimises the amount of binder in the slurry, while using coarse particles and still maintaining good surface finish.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Figure 1:
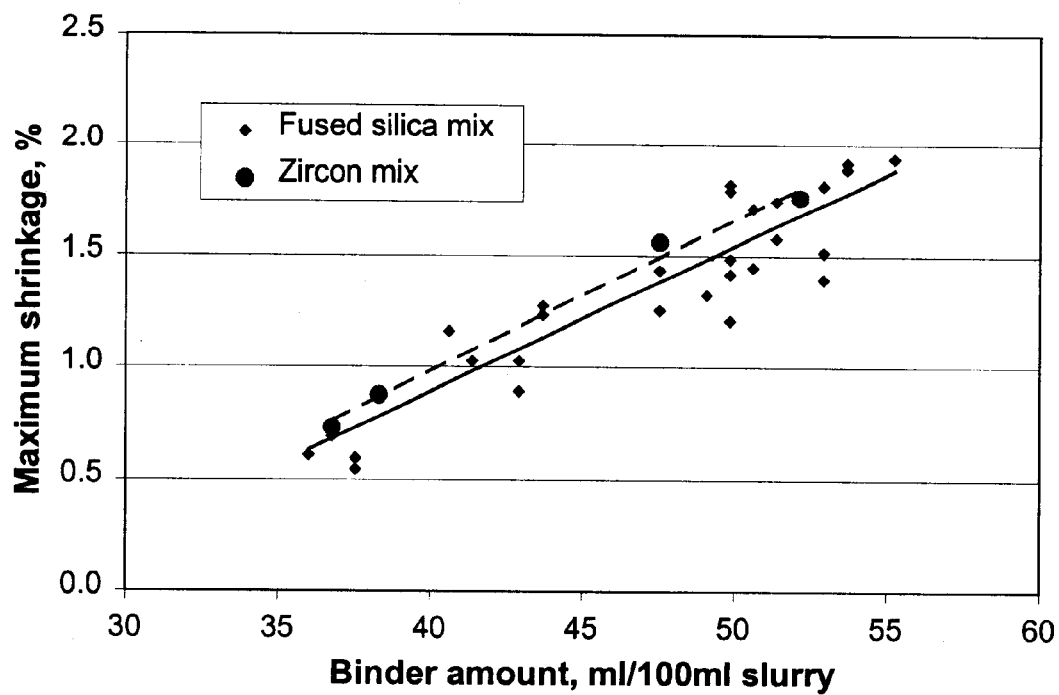
FIG. 1 illustrates the relationship between maximum mould shrinkage during gelling and hardening, versus the critical amount of binder necessary for the slurry for sufficient fluidity.

The invention provides a process for forming ceramic moulds, and a slurry for use in the process. The moulds so formed, and castings made from the moulds also fall within the scope of the invention.

According to the present invention, the particulate refractory mixture in the slurry comprises at least two different refractory materials, one of which has a greater density than the other. The first refractory material has a density of $\rho 1$, and the second refractory material has a density of $\rho 2$, wherein the first refractory material is denser than the second refractory material ($\rho 1 > \rho 2$).

The particle sizes of the first and second refractory materials differ in that the first refractory material has a smaller mean particle size than the second refractory material. Because the first refractory material is denser and of a finer grade (having a smaller mean particle size) than the second refractory material, after pouring the slurry onto the pattern surface, the first refractory material tends to migrate toward the region of the mould adjacent to the pattern surface, which is facing up. The second refractory material, being coarser and lighter than the first, tends to migrate away from the pattern surface as a result of the first refractory material's migration. After the setting of the slurry, a smooth surface layer comprising a high fraction of the first refractory material is formed on the mould. Details of the critical surface of the pattern are thus accurately replicated in the mould surface.

Both the first and second refractory materials may be formed of a single grade of particle, or may be formed of two or more grades of particles, provided that on the whole, the average particle size $\alpha 1$ is smaller than the average particle size $\alpha 2$. By using more than one grade of particle within either the first or second refractory material, the variability of particle sizes within $\alpha 1$ or $\alpha 2$ can be altered. If two or more grades of particles are used within either the first or second refractory material, it is preferable that the finest grade of the lighter material is larger than the coarsest grade of the denser material. By using more than one grade of particle for the first and/or the second refractory material, the amount of binder required in the slurry may be minimized to reduce shrinkage, while suitable fluidity is maintained.

The first refractory material is selected to provide adequate refractoriness to the ceramic mould. A suitable refractory is one that can withstand the heat of molten metal, and which is non-reactive with the metal to be cast. Typical first refractory materials include zircon, alumina, fused silica, aluminium silicates (such as mullite, sillimanite, and calcinated kyanite), or other high temperature and metal non-reactive ceramic materials. Advantageously, zircon can be used in many applications for iron-based castings. In order to impart smooth surface finishes to the ceramic mould and thus to the metal castings, the first refractory material has a fine average particle size, of from about −100 to about −400 mesh, and more preferably having a grade of about −200 mesh or finer.

Table 1 provides typical sieve sizes and standards, for ease of reference. A negative mesh value indicates the maximum size of particle that passes through (or "under") a sieve of the specified mesh value, while a positive mesh value indicates the minimum size of particle that would remain on a sieve of the specified mesh value. Note that for terminology such as "30/50 mesh", it is meant that particles pass under 30 mesh and above 50 mesh.

TABLE 1

Sieve Sizes and Standards

| US Standard Sieve No. | Tyler Screen No. (mesh) | ISO designation (mm) |
| --- | --- | --- |
| 4 | 4 | 4.750 |
| 5 | 5 | 4.000 |
| 6 | 6 | 3.350 |
| 7 | 7 | 2.800 |
| 8 | 8 | 2.360 |
| 10 | 9 | 2.000 |
| 12 | 10 | 1.700 |
| 14 | 12 | 1.400 |
| 16 | 14 | 1.180 |
| 18 | 16 | 1.000 |
| 20 | 20 | 0.850 |
| 25 | 24 | 0.710 |
| 30 | 28 | 0.600 |
| 35 | 32 | 0.500 |
| 40 | 35 | 03425 |
| 45 | 42 | 0.355 |
| 50 | 48 | 0.300 |
| 60 | 60 | 0.250 |
| 70 | 65 | 0.212 |
| 80 | 80 | 0.180 |
| 100 | 100 | 0.150 |
| 120 | 115 | 0.125 |
| 140 | 150 | 0.106 |
| 170 | 170 | 0.090 |
| 200 | 200 | 0.075 |
| 230 | 250 | 0.063 |
| 270 | 270 | 0.053 |
| 325 | 325 | 0.045 |
| 400 | 400 | 0.038 |

Table 2 provides typical densities of minerals that may be used in the invention, for ease of reference. By selecting materials having different densities according to these values, an appropriate slurry can be formed according to the invention. The invention is not limited to the minerals listed in Table 2. The first and second refractory materials may be selected to have any density differential provided that $\rho 1 > \rho 2$. A typical density differential of $\rho 1 : \rho 2 \geq 1.2$ may be used with the invention to ensure that the heavier particles migrate efficiently within the slurry. Mixtures of different materials can be used within either or both the first or second refractory materials, provided that the average density of the mixture of materials maintains $\rho 1 > \rho 2$. Preferably, if a mixture of material is used, the lightest component within the mixture forming the first refractory material is denser than the heaviest component within the mixture forming the second refractory material.

TABLE 2

Properties of Refractory Materials

| Mineral | Density | Colour | Moh's Hardness | Luster | Source (1) |
| --- | --- | --- | --- | --- | --- |
| Aluminite | 1.68 | white | 1 | earthy (dull) | A |
| Cristobalite | 2.27 | grey, blue | 6.5 | vitreous (glassy) | A |
| Gypsum | 2.30 | white | 2 | pearly | A |
| Quartz | 2.63 | brown | 7 | vitreous (glassy) | A |
| Mullite | 3.05 | colourless | 6–7 | vitreous (glassy) | A |

TABLE 2-continued

Properties of Refractory Materials

| Mineral | Density | Colour | Moh's Hardness | Luster | Source (1) |
|---|---|---|---|---|---|
| Sillimanite | 3.24 | bluish | 7 | vitreous (glassy) | A |
| Graphite | 3.40 | black, brownish | 5.5 | vitreous (resinous) | A |
| Kyanite | 3.62 | blue | 4–7 | vitreous (pearly) | A |
| Corundum | 4.05 | blue | 9 | vitreous (glassy) | A |
| Zircon | 4.65 | brown | 7.5 | adamantine | A |
| Zirconilite-2M | 4.70 | black | 5.5 | resinous | A |
| Zirconilite-3O | 4.70 | red, dark | 5.5 | resinous | A |
| Zirconilite-3T | 4.70 | black | 5.5 | resinous | A |
| Zirkelite | 4.70 | black | 5.5 | resinous | A |
| Zirconia(TZP) | 6.04 | white | 6.5 | | B |
| Alumina | 3.7–3.97 | ivory/white | 9 Hv 2000 | | B |

Notes:
(1) Sources: (A) http://webmineral.com; and (B) http://www.ferroceramic.com
(2) Mostly silica glass with impurities of Mg, Fe and other elements
(3) Brown, red, yellow, green, blue, black, & colourless The mean particle size of the second refractory material is coarser than that of the first refractory material. The particle size and proportion (fraction) are selected to minimise mould shrinkage. According to the invention, the total shrinkage of a ceramic mould under a given set of treatment conditions is directly proportional to the volume fraction of ethyl silicate binder within the slurry. It is possible to use particles of the same mean particle size for both the first and second refractory materials, provided that there is adequate density differential for the first refractory material to migrate to the mould surface. In such a case, both first and second materials would be of a finer particle size (within the limits set for the first refractory material), so as to allow for an appropriately accurate mould surface. However, it is advantageous to use particles of different mean particle size, to allow for good packing of finer particles among the coarser particles near the mould surface.

FIG. 1 illustrates the principle that shrinkage increases with binder content. Maximum mould shrinkage during gelling and hardening increases as the critical amount of binder necessary for the slurry for sufficient fluidity increases. A fused silica mix and zircon mix were tested, and the type of refractory material tested had little effect on the total shrinkage of the ceramic mould. A decrease of 50% in binder usage in the slurry reduces the total shrinkage of the ceramic mould by two thirds. Thus, it is highly desirable to reduce the usage of binder in a slurry for ceramic mould fabrication. This is achieved by selecting the proportions of the first and second refractory materials, so that the volume packing density of the slurry is maximised. A mean particle size coarser than 100 mesh is desirable for the second refractory material. According to the invention, high fractions of coarse particles for the second refractory material can be used while still producing good surface finishes because the surface finishes of the mould, and the resulting casting, are mainly influenced by the grade of the denser first refractory material.

The type of refractory materials suitable for the second refractory material can be chosen from those known in the art, such as those noted above for the first refractory material or provided in Table 2, provided that the second refractory material is selected to be less dense than the first refractory material. Because the second refractory material does not directly contact the molten metal when the mould is cast, or has less contact than the first refractory material, a less refractory or less expensive material may be used. For example, sands can be used as the second refractory material.

The binder may comprise those known in the art. The binder may be a lower alkyl silicate, such as ethyl silicate, or an organic silicate, such as ethyl orthosilicate. Also, any alkyl silicate that yields an alcohol with sufficient volatility on hydrolysis can be used. An exemplary ethyl silicate may comprise approximately 18.5–21.0% of silica by weight.

The gelling agent or accelerator preferably has an aqueous base, such as a dilute ammonium hydroxide solution or a dilute ammonium carbonate solution. The amount of gelling agent is determined so that the time between pouring the slurry over the pattern and the start of gelling is about 1 minute, and preferably about 5 minutes, so that the fine particles of the first refractory material have adequate time to migrate to the pattern surface to form a smooth mould surface finish. A person skilled in the art can easily determine the preferred amount of gelling agent, once the first and second refractory materials are selected and proportions of each are determined.

An important aspect of the invention is the use of at least two refractory materials of different density in the slurry, which differ in particle size. The refractory material with the highest density, the first refractory material, is of a finer grade of particle size than the second refractory material. The second refractory material has a lower density and is of a coarser particle size. The second refractory material functions to maximise the packing density of the refractory mixture in the slurry so that the amount of liquid binder required to produce a slurry with appropriate fluidity is minimised. More than one grade or type of material may be used within either or both of the first and second refractory materials.

Using refractory materials selected according to the invention, the first refractory material tends to migrate downward through the slurry, toward the upward-facing pattern surface. A thin surface ceramic layer develops which is mainly formed of the first refractory material at the surface, as illustrated below with reference to Example 1 (see FIG. 2A). As a result, smooth surface finishes of the ceramic mould and the casting can be achieved.

To facilitate the migration of denser particles through the slurry, agitation or vibration of the slurry may be incorporated into the method of forming a mould. Whether or not such agitation is used, after the mould is poured, the slurry is beneficially provided with time to settle so that denser particles can migrate through the slurry, thereby improving the packing density of particles near the mould surface.

An advantage of the invention is that, in order to achieve a smooth surface finish and reduce mould shrinkage by using less binder, the fractions of different refractory materials in a slurry can be selected independently to achieve both optimal dimensional accuracy and surface finish characteristics. This is achieved because the quality of the surface finish is dependent on the segregation of the finest grade of the heavier (first) refractory material while the second refractory material is added, mainly to adjust the solid packing density of the refractory mixture to minimise the use of binder. In this way, the use of high fractions of coarse refractory materials does not reduce surface finish smoothness of the mould and the casting to the extent seen in conventional casting methods. However, in the conventional methods, consistent high accuracy and smooth surface finishes cannot readily be achieved at the same time and compromises are always necessary. For example, to obtain fine surface finishes, higher fractions of fine refractory ingredients in the slurry are required (as discussed in more detail below in Comparative Example 2, and FIG. 3). This necessitates the use of more binders and, in turn, leads to more mould shrinkage (see FIGS. 1 and 3, below) and compromised casting accuracy. On the other hand, according to prior art methodologies, in order to maintain dimensional accuracy, more coarse refractory ingredients are required in the slurry, which produces higher surface roughness.

Compared with the conventional two-layer composite moulding method, mould formation according to the inventive process is simpler and faster while, at the same time, castings produced have both good dimensional accuracy and fine surface finishes. The invention also eliminates any separation/debonding problems between the two ceramic layers as encountered in the known composite mould fabrication process.

The freedom of independently selecting refractory fractions and particle sizes for slurry compositions also makes process control easier than in the prior art. For example, when the refractory material supply changes from one batch or from one manufacturer to another, the only corresponding modification that may be required to the slurry is to adjust the relative fractions of each of the refractory materials so that the minimum amount of binder is used. Such adjustments are very easy to carry out and will have little influence on the consistency of quality of the fabricated ceramic mould and the castings. However, for the conventional methods, surface finishes and dimensional accuracy must be considered simultaneously and the adjustment process for slurry compositions are more complicated in order to obtain consistent results.

EXAMPLE 1

A ceramic mould for the production of steel castings was fabricated according to the invention. Table 3 provides the composition of the slurry used.

TABLE 3

Slurry Composition for Example 1

| Ingredient | Type of Material and Specification | Amount |
| --- | --- | --- |
| First refractory material | Zircon flour (−325 mesh, Elf Atochem, 2000 Market Street, Philadelphia, PA 19103) | 650 g |
| Second refractory material | Fused silica (30/50 mesh, Ranco-Sil ® "B", by R&R) | 350 g |
| Binder | Prehydrolysed ethyl silicate (19.6% $SiO_2$, Silbond ® H-5) | 145 ml |
| Gelling agent | 10% ammonium carbonate aqueous solution | 2.3 ml |

The pattern was fabricated using the stereolithography apparatus (SLA) process. After the slurry was mixed and poured, it was allowed to settle for at least 1 minute to promote migration of denser particles toward the mould surface. The ceramic mould was preheated to 500° C. before casting. A P20 tool steel charge was melted and poured into the ceramic mould at 1550° C. The surface roughness of the casting was Ra 2.1 μm. Note that in this case, the weight fraction of first to second refractory materials was 65:35, the denser of the two materials being present in a greater weight proportion.

Comparative Example 1

For comparison, the same casting as formed in Example 1 was produced using a slurry composed of only fused silica refractory according to methodology similar to that of Example 1.

The composition of the slurry is shown in Table 4. The proportions of the refractory ingredients were selected so that the volume ratio between the fine and the coarse refractory ingredient was the same as that of Example 1 as shown in Table 3, however, the densities of the ingredients in this Comparative Example are equal. The surface roughness of the casting formed according to the Comparative Example 1 was Ra 6.7 μm.

TABLE 4

Slurry Composition According to Comparative Example 1

| Ingredient | Material and specification | Amount |
| --- | --- | --- |
| First refractory ingredient | Fused silica flour (−325 mesh, Ranco-Sil ® "1", by R&R) | 470 g |
| Second refractory ingredient | Fused silica (30/50 mesh, Ranco-Sil ® "B", by R&R) | 530 g |
| Binder | Prehydrolysed ethyl silicate (19.6% $SiO_2$, Silbond ® H-5) | 250 ml |
| Gelling agent | 10% ammonium carbonate aqueous solution | 2.8 ml |

Differences between Example 1 and Comparative Example 1

The moulds of Example 1 of the Comparative Example 1 were formed under the same mould treatment conditions. Further, the same casting conditions were used for Example 1 and the Comparative Example 1.

Figure 2A:
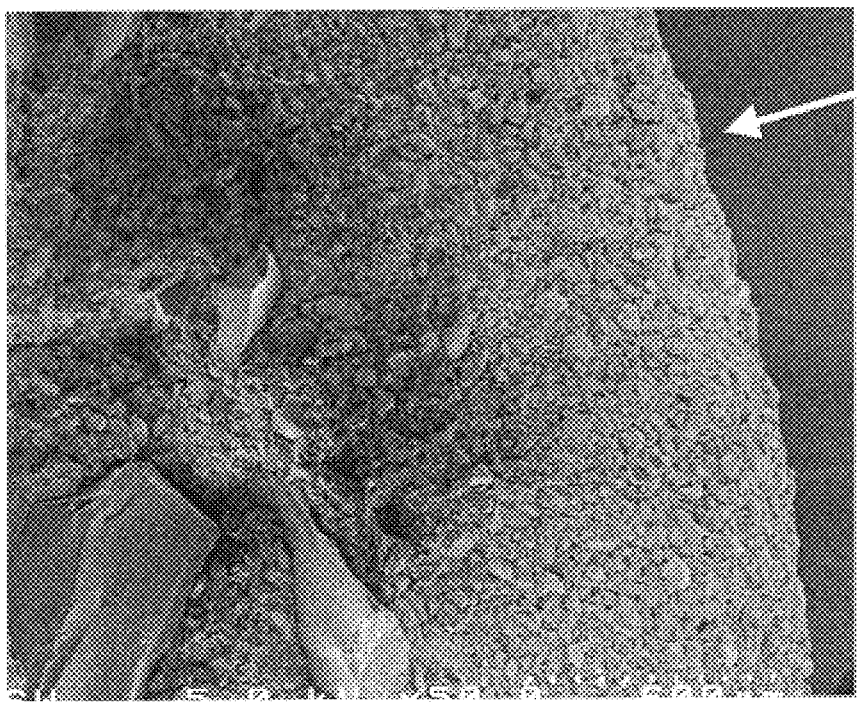
FIG. 2A is a scanning electron micrograph (SEM) illustrating the surface of a mould fabricated using the slurry according to the invention as described in Example 1, illustrating particle distribution across the mould surface.
Figure 2B:
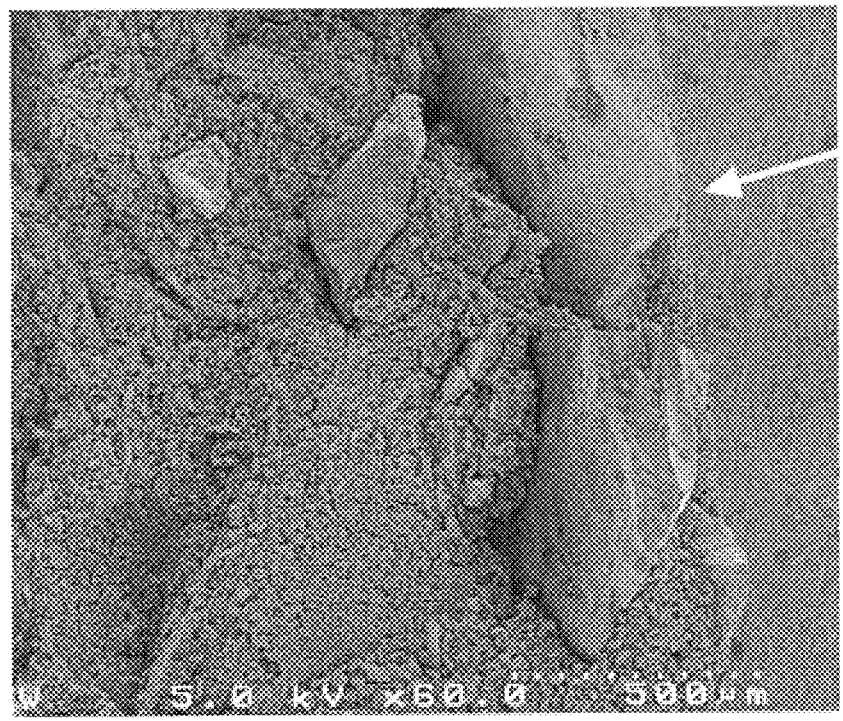
FIG. 2B is a SEM illustration of the surface of a mould fabricated using a conventional slurry composition formed according to Comparative Example 1, illustrating particle distribution across the mould surface for purposes of comparison with FIG. 2A.

FIGS. 2A and 2B illustrate SEM photographic observations of particle distribution across the surface of a mould formed according to Example 1 and a mould formed according to the Comparative Example 1, respectively. For the mould formed using the slurry according to Example 1 of the invention, as shown in Table 3, a thin layer of fine particles is formed on the surface of the mould (FIG. 2A), whereas a mixture of coarse and fine particles is distributed away from the surface. However, for the mould fabricated according to the conventional method outlined in the Comparative Example 1 using the slurry shown in Table 4, the coarse particles are evenly distributed throughout the whole body of the mould and many of the coarse particles are present at the mould surface (the pattern/mould interface), leading to a rougher casting surface.

The surface roughness of the casting formed from a mould according to the Comparative Example 1 (Ra 6.7 μm) was more than three times greater than that of the casting formed from a mould according to Example 1 (Ra 2.1 μm).

Comparative Example 2

Slurries were prepared according to conventional methodology, having a single refractory material of different grades. The fraction of the finer grade and the coarser grade of the material was varied in the slurries prepared. The refractory material was formed of −325 mesh and 30/50 fused silica sands, both grades having an equivalent density.

Figure 3:
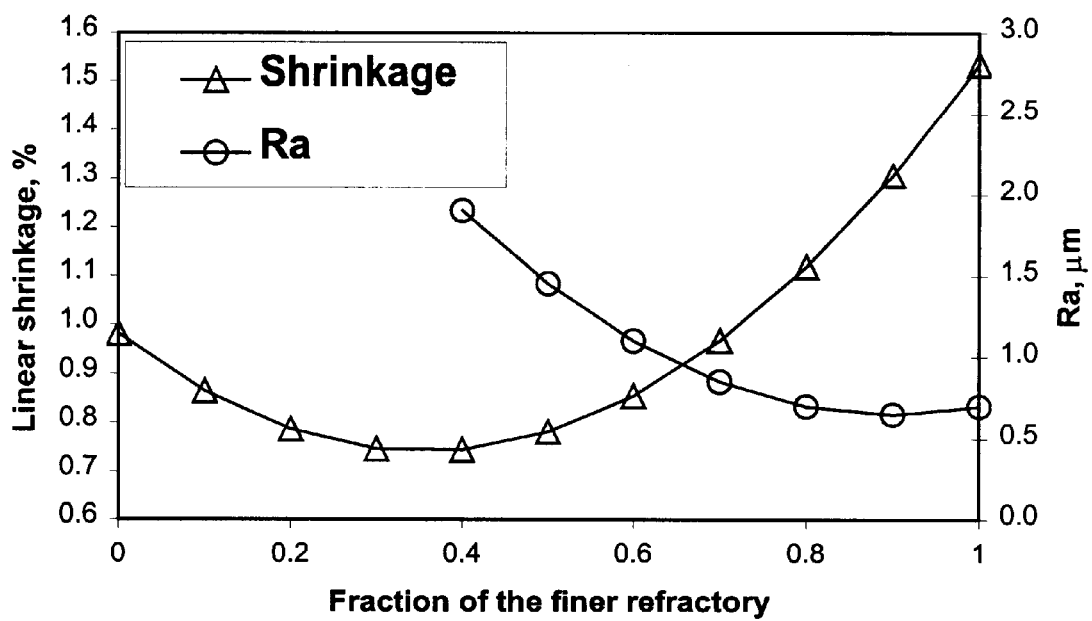
FIG. 3 illustrates the variation in linear shrinkage and surface roughness (Ra) of a conventional ceramic mould, according to Comparative Example 2, as a function of the fraction of the finer refractory ingredient in a slurry composed of −325 mesh and 30/50 mesh fused silica sands. Shrinkage was measured using an amount of binder adequate to produce a slurry with a constant fluidity.

FIG. 3 illustrates the relationship between linear shrinkage and surface roughness (Ra) of a ceramic mould formed with varying fractions of finer grade fused silica sands. Shrinkage was measured using a critical amount of binder necessary to produce slurries of a constant fluidity.

These data illustrate that using conventional methodology, a compromise must be reached between low levels linear shrinkage, shown at lower fractions of the finer refractory component, and reduced surface roughness, shown at higher fractions of the finer refractory component.

The above-described embodiments of the present invention are intended to be examples only. Alterations, modifications and variations may be effected to the particular embodiments by those skilled in the art without departing from the scope of the invention, which is defined solely by the claims appended hereto.

What is claimed is:

1. A process for producing a ceramic mould comprising the steps of:
   a) preparing a slurry comprising a binder, a gelling agent, a first refractory material having a density of $\rho 1$ and a mean particle size of $\alpha 1$, and a second refractory material having a density of $\rho 2$ and a mean particle size of $\alpha 2$, wherein $\rho 1 > 2$ and $\alpha 1 < \alpha 2$; and
   b) casting a ceramic mold using said slurry, wherein the slurry is agitated to promote downward migration of denser particles during the step of casting the ceramic mould.

2. The process according to claim 1, wherein the slurry is allowed to settle for at least one minute during the step of casting a ceramic mould.

3. The process according to claim 1, wherein the slurry is allowed to settle for at least five minutes during the step of casting a ceramic mould.

4. The process according to claim 1, wherein $\rho 1 : \rho 2 \geq 1.2$.

* * * * *